United States Patent
Oh et al.

(10) Patent No.: US 9,866,321 B2
(45) Date of Patent: Jan. 9, 2018

(54) DATA TRANSMISSION SYSTEM FOR AUTOMATED MATERIAL HANDLING SYSTEM

(71) Applicant: Hakseo Oh, Gyeonggi-do (KR)

(72) Inventors: Hakseo Oh, Gyeonggi-do (KR); Hyosuk Park, Gyeonggi-do (KR); Sangkyo Ahn, Gyeonggi-do (KR); Jinhwan Ko, Seoul (KR); Sunghyuk Youn, Incheon (KR); Youlkwon Sung, Gyeonggi-do (KR)

(73) Assignee: Hakseo Oh, Gyeonggi-Do (KR)

( * ) Notice: Subject to any disclaimer, the term of this patent is extended or adjusted under 35 U.S.C. 154(b) by 283 days.

(21) Appl. No.: 14/702,636

(22) Filed: May 1, 2015

(65) Prior Publication Data

US 2015/0316924 A1    Nov. 5, 2015

(30) Foreign Application Priority Data

May 2, 2014  (KR) ......................... 10-2014-0053238

(51) Int. Cl.
  *H04B 10/114*    (2013.01)
  *G05B 19/418*    (2006.01)

(52) U.S. Cl.
  CPC ..... *H04B 10/114* (2013.01); *G05B 19/41865* (2013.01); *G05B 2219/31376* (2013.01)

(58) Field of Classification Search
  CPC ......... G08C 17/02; G08C 23/04; H04L 41/00; H04L 43/00; H04B 10/114; G05B 19/41865; G05B 2219/31376
  See application file for complete search history.

(56) References Cited

U.S. PATENT DOCUMENTS

| 2006/0224048 A1* | 10/2006 | Devaul | A61B 5/0024 600/300 |
| 2006/0265295 A1* | 11/2006 | Feanny | G07C 1/10 705/32 |
| 2009/0074545 A1* | 3/2009 | Lert, Jr. | B65G 1/0492 414/276 |

* cited by examiner

*Primary Examiner* — Walter Divito
(74) *Attorney, Agent, or Firm* — IPLA P.A.; James E. Bame

(57) ABSTRACT

Provided is a data transmission system for automated material handling system in that, in the automated material handling system for transferring the products in course of manufacturing in the semiconductor manufacturing process or the liquid crystal display manufacturing process etc. to each manufacturing station, it switches the communication between the unmanned automatic transfer vehicle and the manufacturing station to the optical communication or the RF communication in readiness for the communication failure between the unmanned automatic transfer vehicle for master and the manufacturing station for slave, it transmits various input and output state data including the communication log data to the higher control system for master or the management computer system of slave/wireless data transmitter-receiver for slave by means of the master and/or slave device through the wire and wireless transmission and reception communication, thereby quickly coping with the operation error through the data analysis.

13 Claims, 6 Drawing Sheets

DATA TRANSMISSION SYSTEM FOR AUTOMATED MATERIAL HANDLING SYSTEM

CROSS REFERENCE

This application claims foreign priority under Paris Convention to Korean Patent Application No. 10-2014-0053238, filed 2 May 2014, with the Korean Intellectual Property Office.

BACKGROUND OF THE INVENTION

1. Field of the Invention

The present invention relates to a data transmission system for automated material handling system, and more particularly, to a data transmission system for automated material handling system in that, in the automated material handling system for transferring the products in course of manufacturing in the semiconductor manufacturing process or the liquid crystal display manufacturing process etc. to each manufacturing station, it switches the communication between the unmanned automatic transfer vehicle and the manufacturing station to the optical communication or the RF communication in readiness for the communication failure between the unmanned automatic transfer vehicle for master and the manufacturing station for slave, it transmits various input and output state data including the communication log data to the higher control system for master or the management computer system of slave/wireless data transmitter-receiver for slave by means of the master and/or slave device through the wire and wireless transmission and reception communication, thereby quickly coping with the operation error through the data analysis.

2. Description of the Related Art

In manufacturing processes of a liquid crystal display device and a semiconductor element, the manufacturing goods are transferred to the manufacturing stations of each manufacturing process by using an automated material handling system (AMHS), so that the corresponding goods are manufactured according to the manufacturing processes of each manufacturing station.

Generally, the automated material handling system includes an unmanned automatic transfer vehicle for transferring a carrier of receiving a semiconductor substrate or a liquid crystal substrate to the manufacturing station located on the manufacturing process line and transferring the carrier of again receiving the goods completely processed in the corresponding manufacturing station to the next manufacturing station.

As well known, depending on the movement method thereof, the unmanned automatic transfer vehicle includes an automated guided vehicle (AGV) for driving through the wheel, a rail guided vehicle (RGV) for driving along the guide rail located at the bottom, and an overhead hoist transport (OHT) for driving a guide rail installed in the ceiling. These transfer vehicles are moved to the corresponding manufacturing station by using the wheel itself or along the bottom rail or the overhead rail and it carries the goods onto or carries the goods out the manufacturing stations unit through the carrier.

The carrying/carrying out of the goods through the carrier is accomplished by the host computers mounted on the unmanned automatic transfer vehicle and the manufacturing stations under the control of the main controller for controlling the entire manufacturing lines.

At this time, in order to perform the carrying/carrying out of the goods between the unmanned automatic transfer vehicle and the manufacturing station, since the interlock operation thereof is accomplished in a state that the location on the carrying/carrying out between them is appropriately aligned, the unmanned automatic transfer vehicle and the manufacturing station are provided with an optical communication or wireless RF communication device so as to send and receives the necessary data.

As disclosed in a SEMI E84-0200A acknowledged as an international standard in 1999, in the interface construction of the automated material handling system using the optical communication device, the communication thereof is accomplished when the unmanned automatic transfer vehicle is arrived at the aligned location of the manufacturing station. Where the carrier is transferred from the unmanned automatic transfer vehicle to the manufacturing station, the communication contents such as an assigning signal (CS_O, CS_1) of the transfer port, a port use signal (VALID), a transfer request signal (TR_REQ), a working signal (BUSY), and a completion signal (COMPT) are transmitted from the unmanned automatic transfer vehicle to the manufacturing station. Also, the return request signal (L_REQ) and the return permission signal (READY) are transmitted from the manufacturing station to the unmanned automatic transfer vehicle. These signals are continually transmitted and received during the carrying and carrying out thereof.

However, during the carrying and carrying out of the goods between the unmanned automatic transfer vehicle and the manufacturing station, the operation sequence errors such as the communication disruption on account of the surrounding noise, the timing error between the unmanned automatic transfer vehicle for master and the manufacturing station for slave, and the reception error of the communication data from the adjacent master/slave device etc. can be occurred.

When these operation sequence errors are occurred, it is necessary to quickly grasp and handle the cause of the operation error so as to resume the operation thereof. Also, during the communication disruption, it is switched to other communication media so as to recover the communication thereof, thereby it is necessary to maintain the continuity of the operation.

However, in the conventional art, since it takes only the optical communication method using the IR communication, the communication distance thereof is short and the communication is an one-way communication. Also, during the communication error, there is a defect in that the operation of the manufacturing line itself is stopped until the error is solved.

Also, since the input and output signals are stored in a non-volatile memory such as an EEPROM, there is a problem in that the stored data should be deleted so as to store the data of a new cycle after the completion of the operation sequence of one cycle. Moreover, since the input and output logs are stored in the non-volatile memory such as the EEPROM, there is a problem in the implementation of high response speed owing to the time problem of deleting the pre-stored data so as to store the data of a new cycle. Furthermore, it is unsuitable for storing a lot of logs. That is, where the power is always supplied, it is not necessary to use the non-volatile memory so as to store large amounts of logs.

In addition, in case of the log data capable of identifying the error condition, since only the CPU itself timer value, that is, the relative time information between the signals existed in the master or the slave is stored, where a lot of log data is stored therein, the time information managed by the actual equipment is different from the pre-stored time information. Accordingly, there is a problem in that it is difficult to find the corresponding log during the error analysis.

In addition, since there is no communication means capable of directly transmitting the pre-stored data from the master of the unmanned transport vehicle or the slave of the manufacturing station to the separate control terminal or main controller, there are several drawbacks in that it is necessary to connect a separate data record means to the master or the slave so as to fetch the data.

SUMMARY OF THE INVENTION

Accordingly, the present invention has been made to solve the above-mentioned problems occurring in the prior art, and a object of the present invention is to provide a data transmission system for automated material handling system in that, in the automated material handling system for transferring the products in course of manufacturing in the semiconductor manufacturing process or the liquid crystal display manufacturing process etc. to each manufacturing station, it switches the communication between the unmanned automatic transfer vehicle and the manufacturing station to the optical communication or the RF communication in readiness for the communication failure between the unmanned automatic transfer vehicle for master and the manufacturing station for slave, it transmits various input and output state data including the communication log data to the higher control system for master or the management computer system of slave/wireless data transmitter-receiver for slave by means of the master and/or slave device through the wire and wireless transmission and reception communication, thereby quickly coping with the operation error through the data analysis.

According to an aspect of the invention to achieve the object described above, there is provided a data transmission system for automated material handling system having master devices mounted on a plurality of automatic transfer vehicles, slave devices mounted on a plurality of manufacturing station units having an unique ID, and a main controller interlocked with at least any one of the master devices and the slave device to be operated, wherein the master device comprises a data transmission unit for master and a local controller for master; the data transmission unit for master comprises an IR transmission and reception circuit, a RF transmission and reception circuit, and a transmission and reception circuit unit for master and a processor for master for transmitting and receiving the data between the master device and the slave device; the data transmission unit for slave comprises an IR transmission and reception circuit, a RF transmission and reception circuit, and a transmission and reception circuit unit for slave and a processor for slave for transmitting and receiving the data between the master device and the slave device; the data transmission unit for master and the data transmission unit for slave serve to mutually transmit and receive a state data including a log data of the master and a log data and the ID of the slave between the master device and the slave device; and at least any one of the processes for master and slave sets any one of the IR transmission and reception circuit and the RF transmission and reception circuit as a basic transmission and reception circuit per each manufacturing station unit in advance so as to mutually perform the transmission and reception between the master device and the slave device and switches the transmission and reception circuit so as to allow the other transmission and reception circuit to be operated, if the transmission and reception is not performed between the established transmission and reception circuit, thereby performing the carrying/carrying-out of the goods.

Preferably, the processor for master or slave includes a clock function in addition to the timer function.

Preferably, the processors for master or slave records an input and output data according to the mutual communication, a timing during the input and output of the data, and an input and output time and record a state data information including a noise level, a receiving sensitivity, a transmission subject of the master and slave, a number of communication success, an optical signal timing information in the course of a series of operations, and a storage log information received from the opposing transmittance unit.

Preferably, the data transmission unit connected to the processor further comprises a volatile memory for recording an input and output data according to the mutual communication, a timing during the input and output of the data, and an input and output time and recording a state data information including a noise level, a receiving sensitivity, a transmission subject of the master and slave, a number of communication success, an optical signal timing information in the course of a series of operations, and a storage log information received from the opposing transmittance unit.

Preferably, the data transmission unit for master and the data transmission unit for slave request the transmission of the respective state data according the mutual operation sequence; transmit and receive the respective state data through each transmitting and receiving circuit part by using IR or RF communication; the data transmission unit for master allows his state data and the state data for salve received from the data transmission unit for slave to record in the local controller for master; and in request of the main controller CM, the local controller for master transmits the state data for master and the state data for slave recorded therein to the main controller.

Preferably, the data transmission unit for master is communicated with the local controller for master through the serial port and the local controller for master is wireless communicated with the main controller.

Preferably, the main controller is a higher control system of the master device.

Preferably, the data transmission unit for master and the data transmission unit for slave request the transmission of the respective state data according the mutual operation sequence; transmit and receive the respective state data through each transmitting and receiving circuit part by using IR or RF communication; and in request of the main controller CM, the data transmission unit for slave transmits the state data for slave and the state data for master received from the data transmission unit for master to the main controller.

Preferably, the data transmission unit for slave comprises a serial port and a wireless port; and in request of the main controller, the data transmission unit for master and the data transmission unit for slave transmit the state data itself and the state data received from the opposing transmittance unit to the main controller in real time through the serial port or the wireless port.

Preferably, in the main controller is a management computer including a notebook computer and the management computer is communicated with the data transmission unit for slave through the serial communication.

Preferably, the main controller is a wireless data transmitting and receiving terminal including a wireless data transmitter-receiver and the wireless data transmitting and receiving terminal is wireless communicated with the data transmission units for slave.

Preferably, the data transmission unit for master and the data transmission unit for slave stores the input data itself transmitted and received to each other and the opposing input data received from the opposing data transmission unit in an internal RAM of the processor itself.

Preferably, the data transmission unit for master and the data transmission unit for slave stores the input data itself transmitted and received to each other and the opposing input data received from the opposing data transmission unit in a non-volatile memory.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the invention will be described in detail with reference to the accompanying drawings.

Figure 1A:
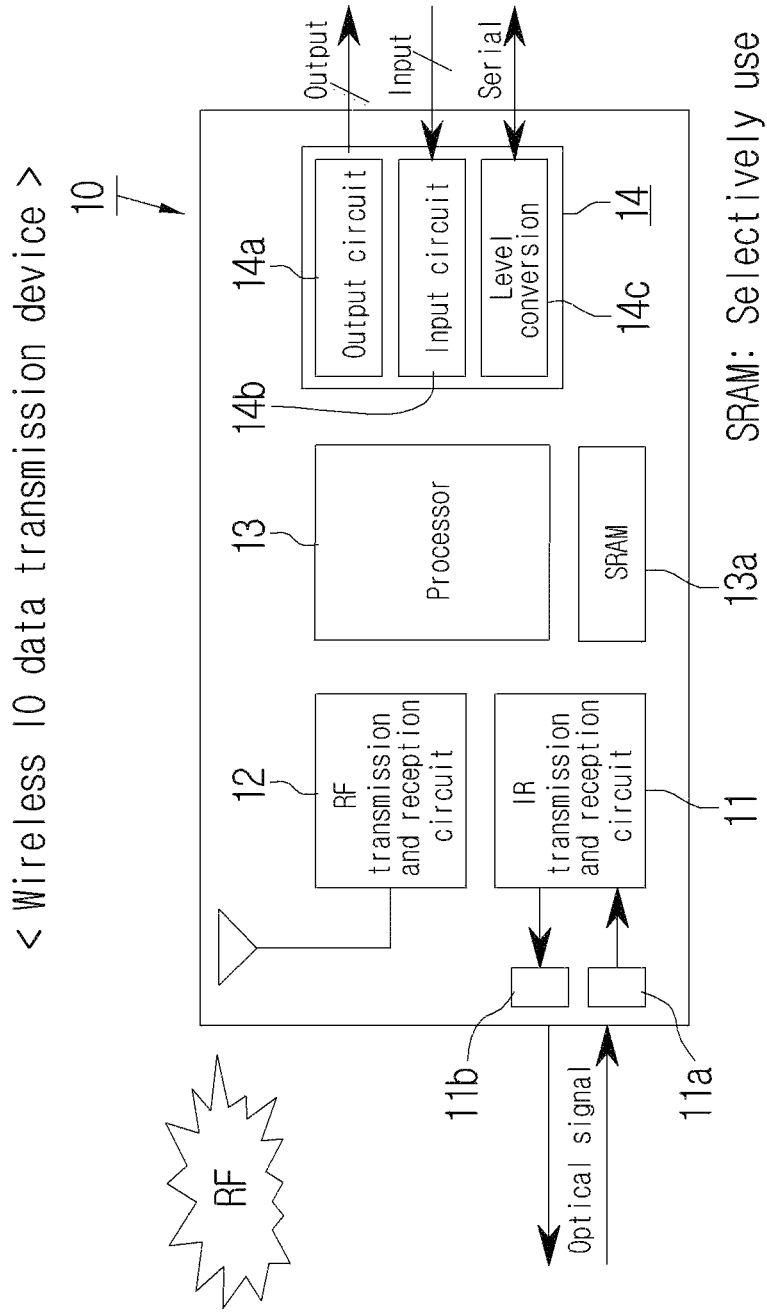
FIG. 1A is a block diagram showing a data transmission unit of a data transmission system for automated material handling system according to the present invention.
Figure 1B:
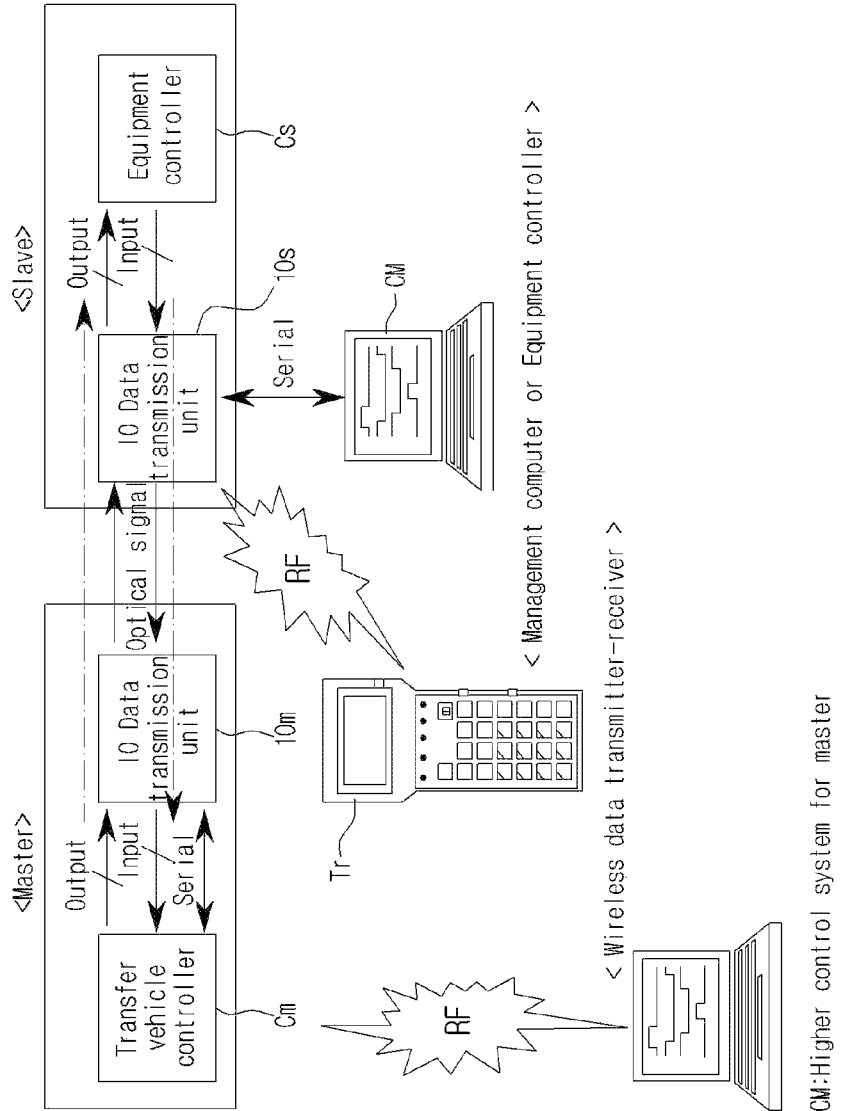
FIG. 1B is a block diagram showing an optical communication system of FIG. 1A.
Figure 1C:
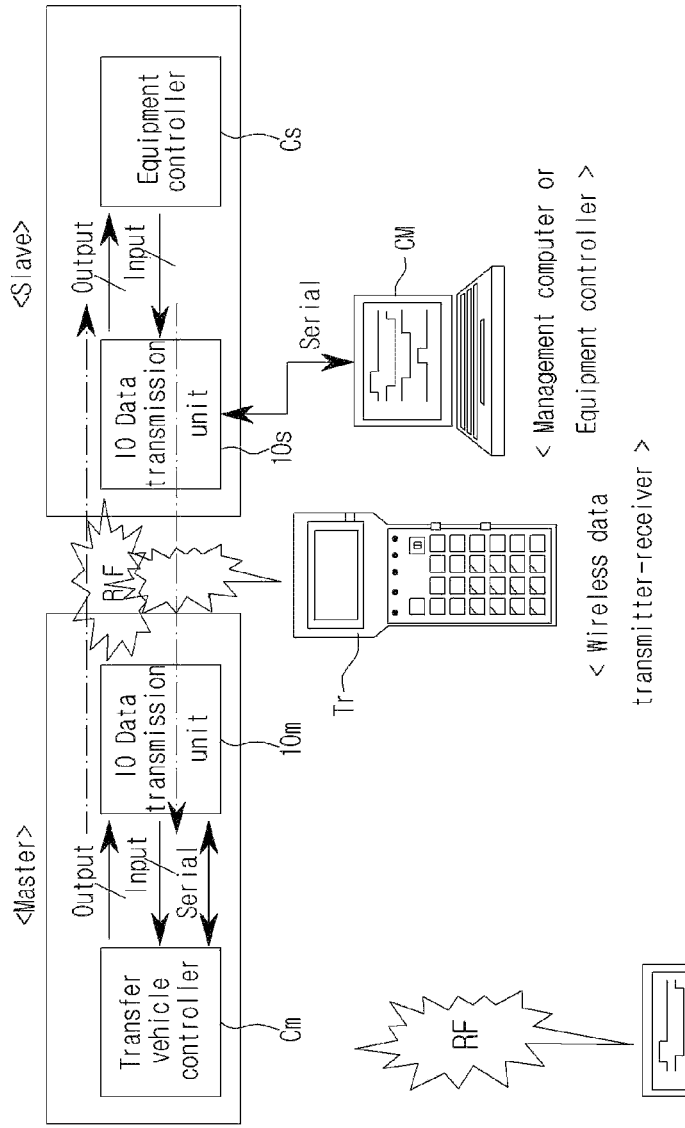
FIG. 1C is a block diagram showing a RF communication system of FIG. 1A.
Figure 2:
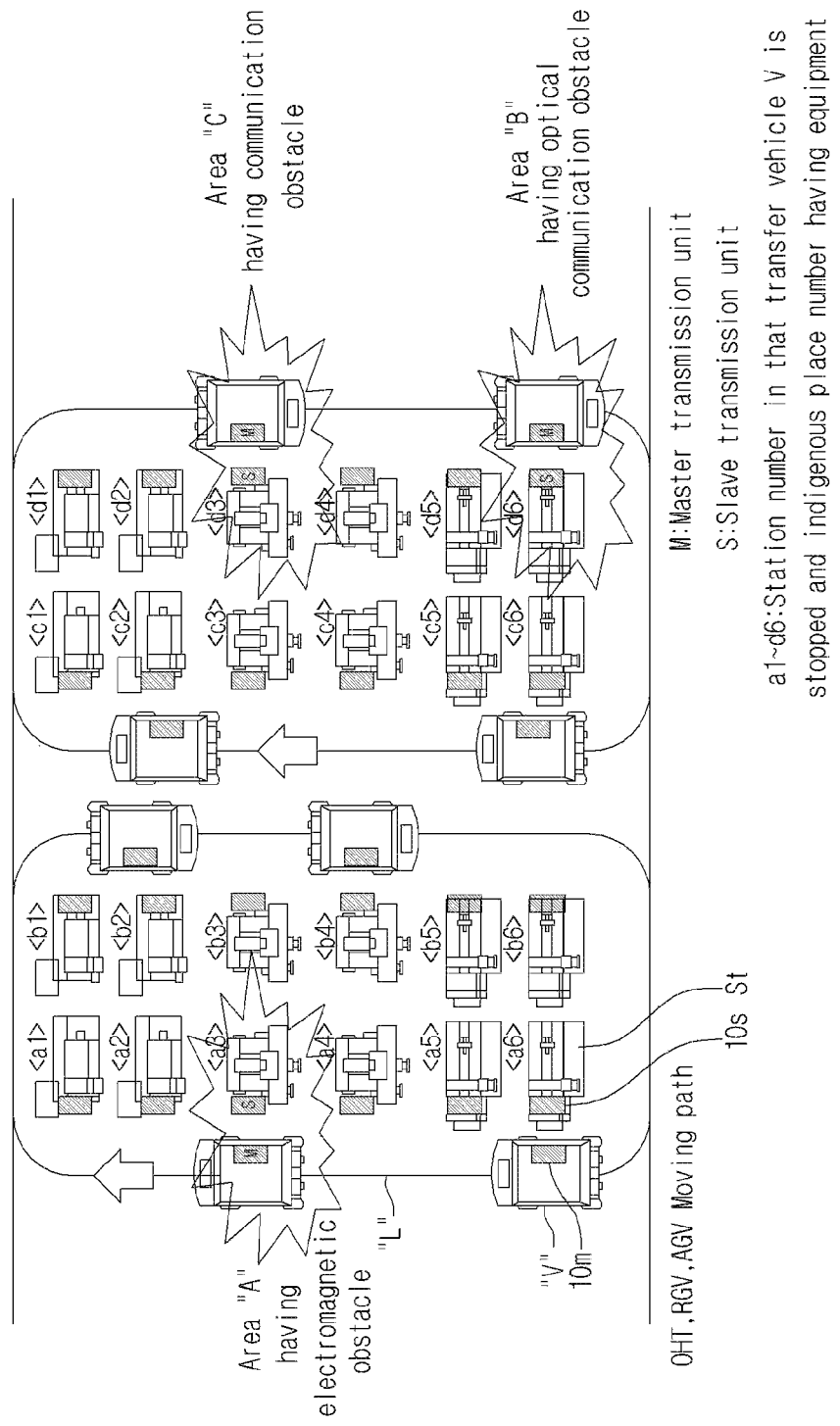
FIG. 2 is an example view showing a situation of the communication jamming between an automatic transfer vehicle and a manufacturing stations unit in a data transmission system for automated material handling system according to the present invention.
Figure 3:
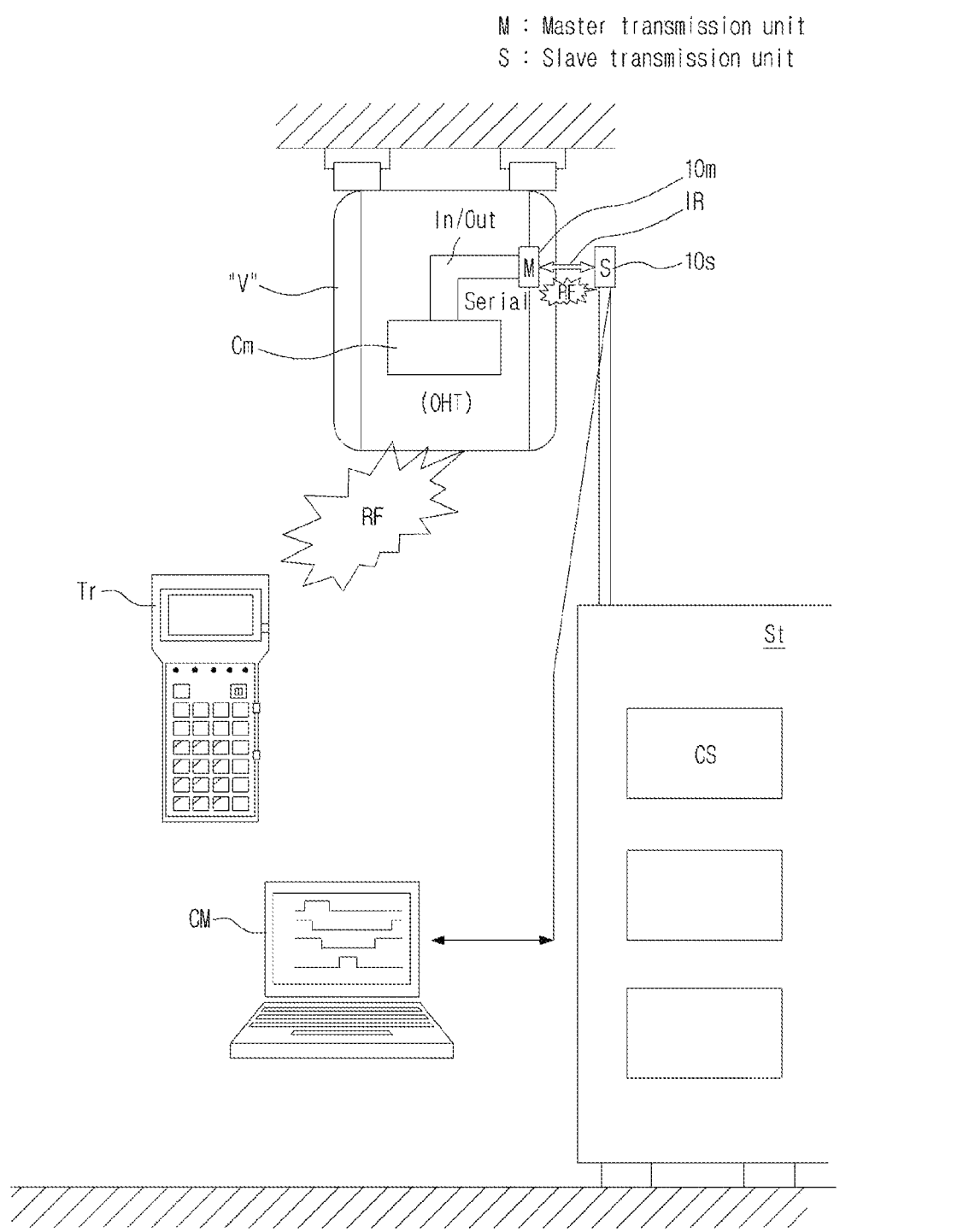
FIG. 3 is an example view showing an example of a data receiving through an automatic transfer vehicle for master in a data transmission system for automated material handling system according to the present invention.
Figure 4:
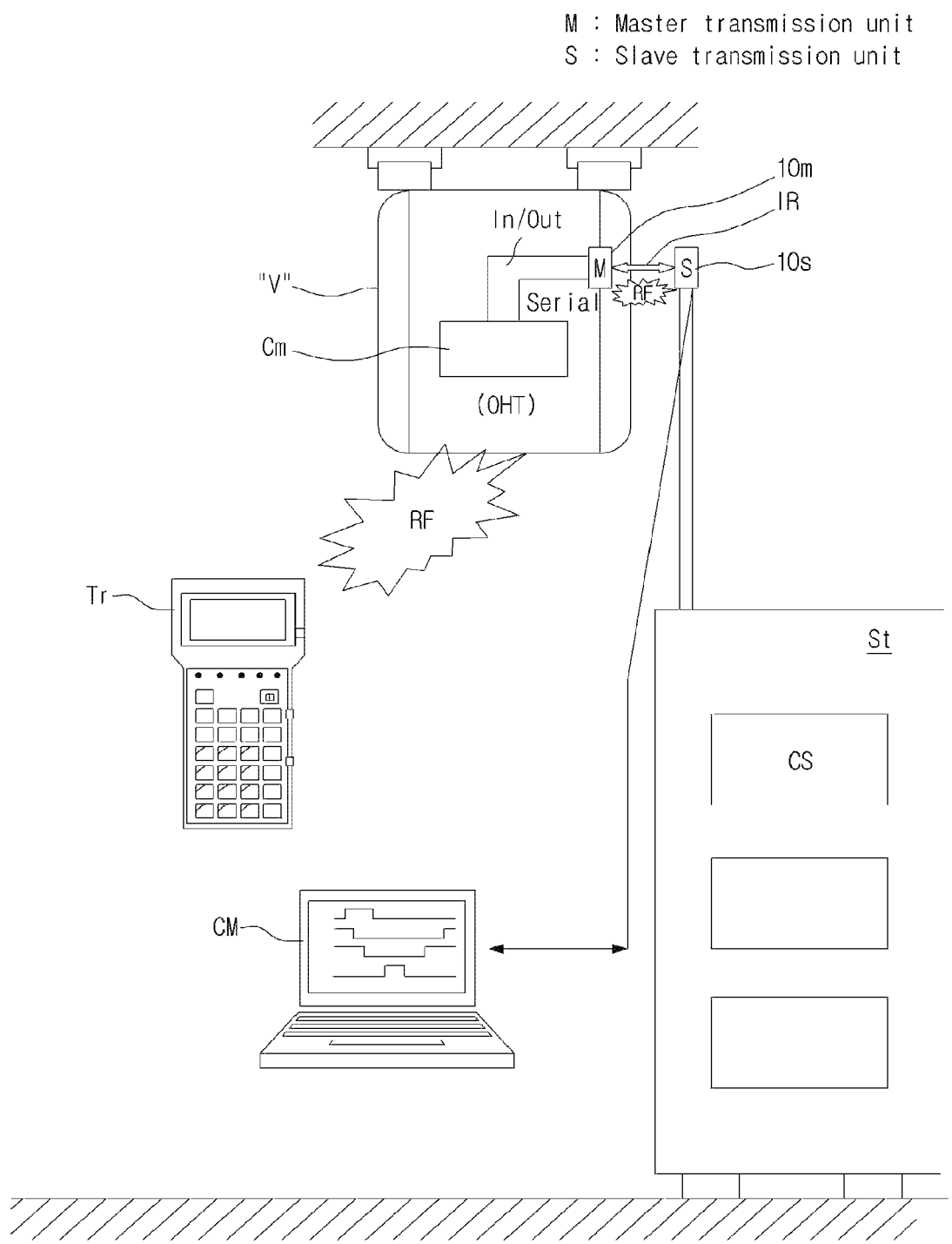
FIG. 4 is an example view showing an example of a data receiving through a manufacturing stations unit for slave in a data transmission system for automated material handling system according to the present invention.

FIG. 1A is a block diagram showing a data transmission unit of a data transmission system for automated material handling system according to the present invention, FIG. 1B is a block diagram showing an optical communication system of FIG. 1A, FIG. 1C is a block diagram showing a RF communication system of FIG. 1A, FIG. 2 is an example view showing a situation of the communication jamming between an automatic transfer vehicle and a manufacturing stations unit in a data transmission system for automated material handling system according to the present invention, FIG. 3 is an example view showing an example of a data receiving through an automatic transfer vehicle for master in a data transmission system for automated material handling system according to the present invention, and FIG. 4 is an example view showing an example of a data receiving through a manufacturing stations unit for slave in a data transmission system for automated material handling system according to the present invention.

The automatic transfer vehicle V of the automated material handling system showed in the drawing is a vehicle for carrying the goods onto or carrying the goods out the manufacturing stations unit St(a1-a6, b1-b6, c1-c6, and d1-d6) arranged on the manufacturing process line L such as a semiconductor manufacturing devices or a liquid crystal display devices etc. In the drawings, an Overhead Hoist Transport (OHT), which is driven along the guide rail installed on the ceiling, is illustrated. However, the present invention can applied to other types of vehicles as well as.

Referring to the drawings, the data transmission system for automated material handling system includes a data transmission unit for master 10m and a local controller for master Cm installed on the automatic transfer vehicle V, a data transmission unit for slave 10s and a local controller for slave Cs installed on the manufacturing stations unit St, and a main controller CM for controlling them located at the outside of the automatic transfer vehicle V and the manufacturing stations unit St.

At this time, the plurality of the automatic transfer vehicles for master V and manufacturing stations units St are arranged on the manufacturing process lines.

The manufacturing stations units St are set to unique IDs respectively and the automatic transfer vehicles for master V are set to the unique ID of the working manufacturing stations unit St to be communicated with each other. That is, the data transmission unit for slave 10s is responded to only the data of the data transmission unit for master 10m corresponded to his unique ID, so that it is communicated with each other. The input and output state data transmitted and received between the master device and the slave device can figure out the operation situation of each unit through the log data for master and slave.

The above setting of the ID can prevent the abnormality of the sequence owing to the receiving of the data from the adjacent master or slave during 1:1 communication between the master and the slave. The IR communication method can use the unique ID. However, it may not use the unique ID. Besides the ID setting and the input and output data, a code for confirming whether the data transmission device is the master or the slave is added to the additional data, so that the slave communication module can analyze an occurrence of the interference with the adjacent other communication module when it receives the salve data. Also, where the master data is received from the master device, the interference with the adjacent device owing two or more master devices can be removed.

The data transmission units 10m and 10s include an IR transmission and reception circuit 11 and a RF transmission and reception circuit 12 respectively. The data transmission units 10m and 10s includes a transmission and reception circuit unit for transmitting and receiving the input and output data of the master device and the slave device between them.

The IR transmission and reception circuit 11 includes a light receiving part 11a and a light emitting part 11b for receiving and transmitting the light signals between the master device and the slave device respectively.

The data transmission units 10m and 10s include a process 13 for setting any one of the IR transmission and reception circuit 11 and the RF transmission and reception circuit 12 as a basic transmission and reception circuit per each manufacturing station unit in advance so as to mutually perform the transmission and reception between the master device and the slave device and switching the transmission and reception circuits so as to allow the other transmission and reception circuit to be operated if the transmission and reception is not performed between the established transmission and reception circuit, thereby performing the carrying/carrying-out of the goods.

Also, the data transmission units 10*m* and 10*s* include a data input and output part 14 having an output circuit part 14*a* for outputting the data, an input circuit part 14*b* for inputting the input data, and a data level conversion part 14*c* for converting the data level respectively.

The communication error or jamming can be usually generated owing to the electromagnetic noise influenced on the transmission and reception circuit of the optical mode in an optical sensor, a fluorescent light, a remote controller, and an IrDA etc. Also, in the wireless RF communication mode, the jamming of the RF or optical communication can be generated owing to the electromagnetic wave of a wireless LAN, a ZigBee, and a Bluetooth etc.

The processor 13 can prevent the downtime of the system by switching the communication mode to the optical communication or the RF communication during the communication jamming.

The situation of the communication jamming is illustrated in FIG. 2.

As shown in FIG. 2, in the manufacturing process line L, the automatic transfer vehicle V receives the IDs (a1-d6) of the manufacturing station units and the order signals such as the carrying/carrying-out signal of the goods or the kinds thereof from the high system (main controller: CM) to be moved. The communication media (optical communication or RF communication) used by each station unit is set in an internal map information of the automatic transfer vehicle V.

In case of the area "A" having the electromagnetic obstacle, where the communication fault is occurred between the master device and the slave device in a state that the communication media capable of using in the station unit a3 is set to the RF communication, the automatic transfer vehicle V sends the command of the media change (optical communication mode) to the data transmission unit for master 10*m* so as to change the communication media, thereby restarting the communication. When these RF communications errors are consistently occurred, in the internal map information of the automatic transfer vehicle, the communication mode can be changed from the RF communication to the optical communication.

In case of the area "B" having the optical communication obstacle, where the communication fault is occurred between the master device and the slave device in a state that the communication media capable of using in the station unit d6 is set to the optical communication, the automatic transfer vehicle V sends the command of the media change (RF communication mode) to the data transmission unit for master 10*m* so as to change the communication media, thereby restarting the communication. When these optical communications error is consistently occurred, in the internal map information of the automatic transfer vehicle, the communication mode can be changed from the IR optical communication to the RF communication.

In case of the area "C" having the communication obstacle, where the communication fault is abruptly occurred in a state that it is communicated by any one communication media, it is changed to other communication media, so that the carrying/carrying-out works can be consistently performed.

In the above case, the automatic transfer vehicle initiatively changes the communication media. However, the data transmission unit itself can also, solve the problem.

For example, the order of the priority of the communication media on the data transmission unit is specified by the user, so that the communication between the master device and the slave device is performed by using the designated communication media. If there is no response from the slave device during the communication using the corresponding communication media, it is judged that the communication interference is occurred. At this time, the data transmission unit for master serves to change the communication media to other communication means and transmit the corresponding data. In this case, the slave device can be always received to all the communication media and respond to the data by using the corresponding communications media for receiving the data.

The processor includes a clock function in addition to the timer function. Therefore, the processors for master and slave serve to record the input and output data, the timing during the input and output of the data, and the input and output time and record the state data information including the noise level, the receiving sensitivity, the transmission subject of the master and slave, the number of communication success, the optical signal timing information in the course of a series of operations, and the storage log information received from the opposing transmittance unit through the optical or RF communication.

In the record data, the timing during the input and output of the data and the input and output time are an advantage to an analysis of sequence errors, because the comparative timing during the input and output of the data is compared with the absolute timed together. Since the receiving sensitivity is stored together with a signal strength information received in the receiving circuit before the transmission of the data, it can check out the surrounding noise situation during the occurrence of the sequence error, thereby analyzing the exact cause thereof. Also, the number of the communication per second at the point of the sequence changes can confirm as to whether the communication line is stable in each sequence status. At this time, if the value is small, it is known that the communication is broken off. Moreover, it records the optical signal waveform received in the course of a series of operations and check out this data in case of troubles, so that it can easily grasp the kind of the noise introduced from the outside, thereby easily establishing the countermeasure.

The data transmission units 10*m* and 10*s* utilize a memory existed in the processor 13 or further includes a volatile memory 13*a* such as a large-capacity SRAM if it is necessary to record a large amount of working information. At this time, instead of the processor 13, the corresponding memory can record the input and output data, the timing during the input and output of the data, and the input and output time and record the state data information including the noise level, the receiving sensitivity, the transmission subject of the master and slave, the number of communication success, the optical signal timing information in the course of a series of operations, and the storage log information received from the opposing transmittance unit through the optical or RF communication.

By employing the large-capacity volatile memory, these logs information can be stored a lot. Where a large amount of the log information are stored, there is a merit in that the line is immediately operated after the recovery of the error thereof and it can perform an error analysis thereof together in a state of the line operation.

Also, the data transmission system further includes a wireless data transmitting and receiving terminal Tr (or a main controller such as a management computer) as a wireless data transmitter-receiver communicated with the data transmission units for master and slave 10*m* and 10*s* through the wireless RF or serial ports RS-232, RS-422, RS-485, USB, and Ethernet etc. and capable of wirelessly transmitting the data from the corresponding data transmission unit.

Referring to the state data transmitted and received between the mast device and the slave device, where the operation sequence error is occurred in the transmission system or in order to prevent the sequence error, the master and slave devices request the transmission of the respective state data according the mutual operation sequence and transmit and receive the respective state data through each transmitting and receiving circuit part to be stored therein, and transmit the stored state data to the main controller CM or the wireless data transmitting and receiving terminal through the RF communication or the serial port.

FIG. 3 illustrates a method of transmitting the data from the master device. Referring to FIG. 3, the data transmission unit for master 10m and the data transmission unit for slave 10s request the transmission of the respective state data according the mutual operation sequence and transmit and receive the respective state data through each transmitting and receiving circuit part by using IR or RF communication to be stored in the internal RAM of each processor together with his state data. At this time, the data transmission unit for master 10m serves to allow his state data and the state data for salve received from the data transmission unit for slave 10s to record in the local controller for master Cm. In request of the main controller CM, the local controller for master Cm serves to transmit the state data for master and the state data for slave recorded therein to the main controller CM or the wireless data transmitting and receiving terminal Tr.

At this time, the data transmission unit for master 10m can be communicated with the local controller for master Cm through the serial port. Also, the local controller for master be wireless communicated with the main controller CM. Here, the main controller CM of controlling the total works may be a higher control system of the master device.

FIG. 4 illustrates a method of transmitting the data from the data transmission unit for slave 10s. Referring to FIG. 4, the data transmission unit for master 10m and the data transmission unit for slave 10s request the transmission of the respective state data according the mutual operation sequence and transmit and receive the respective state data through each transmitting and receiving circuit part by using IR or RF communication to be stored in the internal RAM of each processor together with his state data. In request of the main controller CM, and the data transmission unit for slave 10s serves to transmit the state data for slave itself and the state data for slave recorded therein to the main controller CM or the wireless data transmitting and receiving terminal Tr.

At this time, the data transmission unit for slave 10s can include the serial port and the wireless port. In request of the main controller CM, without storing the state data for slave itself and the state data for master salve received from the data transmission unit for master 10m in the internal RAM of the processor, the data transmission unit for slave 10s can be communicated with the main controller CM in real time through the serial port or the wireless port.

In this case, if it uses these functions, it is unnecessary to store the logs through the SRAM or the ROM. Accordingly, since the logs can be directly stored in the computer for analysis (main controller), it can collect a lot of logs without the capacity limit.

In the above data acquiring method through the data transmission unit for slave 10s, the main controller CM is the management computer including the notebook computer and the management computer can be communicated with the data transmission unit for slave 10s through the serial communication.

Also, the main controller CM is the wireless data transmitting and receiving terminal including the wireless data transmitter-receiver and the wireless data transmitting and receiving terminal can be communicated with the data transmission unit for slave 10s through the wireless communication.

According to the above construction, the transmission unit does not require the separate log storage memory and it can analyze the log data stored in the computer directly connected to the transmission unit without going to the working place during the occurrence of the operation sequence error. Also, it is possible to operate the line after the treatment of the error, thereby improving the operation rate of the line. Moreover, since all data received from the master and slave transmission units is existed, it is possible to analyze the exact cause of the error.

On the other hand, the state data for master and slave stored through the communication between the data transmission units for master and slave can be stored in the separated volatile memory, not the internal RAM of each processor.

In this case, the data transmission unit for master 10m and the data transmission unit for slave 10s request the transmission of the respective state data according the mutual operation sequence and transmit and receive the respective state data through each transmitting and receiving circuit part by using IR or RF communication to be stored in the volatile memory together with his state data. At this time, In request of the higher control system for master or the management computer system of slave/wireless data transmitter-receiver for slave, the local controller for master Cm or the data transmission unit for slave 10s serves to transmit the state data for slave and the state data for master stored in the volatile memory to the higher control system for master or the management computer system of slave/wireless data transmitter-receiver for slave through the serial or wireless communication.

As described above, in the data transmission manner according to the present invention, since the working can be performed in a state that all lines are operated, the present invention has different constructions in comparison with the conventional art. Also, since all of the log data of the data transmission units for master and slave 10s are provided, it has an advantage on the analysis of the exact cause during the occurrence of the sequence error.

According to the data transmission system for automated material handling system as described above, in the automated material handling system for transferring the products in course of manufacturing in the semiconductor manufacturing process or the liquid crystal display manufacturing process etc. to each manufacturing station, it switches the communication between the unmanned automatic transfer vehicle and the manufacturing station to the optical communication or the RF communication in readiness for the communication failure between the unmanned automatic transfer vehicle for master and the manufacturing station for slave, it transmits various input and output state data including the communication log data to the higher control system for master or the management computer system of slave/wireless data transmitter-receiver for slave by means of the master and/or slave device through the wire and wireless transmission and reception communication, thereby quickly coping with the operation error through the data analysis.

Although the invention has been described according to the preferred embodiment mentioned above, the invention can be variously changed and modified without deviating from the essential point and scope of the invention. Accordingly, the accompanying Claims include such change and modification belonging to the essential point of the invention.

What is claimed is:

1. A data transmission system for automated material handling system having master devices mounted on a plurality of automatic transfer vehicles, slave devices mounted on a plurality of manufacturing station units having an unique identification (ID), and a main controller interlocked with at least any one of the master devices and the slave device to be operated, wherein the master device comprises a data transmission unit for master and a local controller for master;

the slave device comprises a data transmission unit for slave and a local controller for slave;

the data transmission unit for master comprises an infrared (IR) transmission and reception circuit, a radio frequency (RF) transmission and reception circuit, and a transmission and reception circuit unit for master and a processor for master for transmitting and receiving the data between the master device and the slave device;

the data transmission unit for slave comprises an IR transmission and reception circuit, a RF transmission and reception circuit, and a transmission and reception circuit unit for slave and a processor for slave for transmitting and receiving the data between the master device and the slave device;

the data transmission unit for master and the data transmission unit for slave serve to mutually transmit and receive a state data including a log data of the master and a log data of the slave and the ID of the slave between the master device and the slave device; and at least any one of the processes for master and slave sets any one of the IR transmission and reception circuit and the RF transmission and reception circuit as a basic transmission and reception circuit per each manufacturing station unit in advance so as to mutually perform the transmission and reception between the master device and the slave device and switches the transmission and reception circuit so as to allow the other transmission and reception circuit to be operated, if the transmission and reception is not performed between the established transmission and reception circuit, thereby performing carrying goods onto or carrying goods out of the manufacturing station units;

wherein the processor for master or slave includes a clock function in addition to timer function; and wherein the processors for master or slave records an input and output data according to the mutual communication, a timing during the input and output of the data, and an input and output time and record a state data information including a noise level, a receiving sensitivity, a transmission subject of the master and slave, a number of communication success, an optical signal timing information in the course of a series of operations, and a storage log information received from the opposing transmittance unit.

2. The data transmission system for automated material handling system according to claim 1, wherein the data transmission unit connected to the processor further comprises a volatile memory for recording an input and output data according to the mutual communication, a timing during the input and output of the data, and an input and output time and recording a state data information including a noise level, a receiving sensitivity, a transmission subject of the master and slave, a number of communication success, an optical signal timing information in the course of a series of operations, and a storage log information received from the opposing transmittance unit.

3. The data transmission system for automated material handling system according to claim 1, wherein the data transmission unit for master and the data transmission unit for slave request the transmission of the respective state data according the mutual operation sequence; transmit and receive the respective state data through each transmitting and receiving circuit part by using IR or RF communication; the data transmission unit for master allows its state data and the state data for slave received from the data transmission unit for slave to record in the local controller for master; and in request of the main controller, the local controller for master transmits the state data for master and the state data for slave recorded therein to the main controller.

4. The data transmission system for automated material handling system according to claim 3, wherein the data transmission unit for master is communicated with the local controller for master through a serial port and the local controller for master is wireless communicated with the main controller.

5. The data transmission system for automated material handling system according to claim 3, wherein the main controller is a higher control system of the master device.

6. The data transmission system for automated material handling system according to claim 1, wherein the data transmission unit for master and the data transmission unit for slave request the transmission of the respective state data according the mutual operation sequence; transmit and receive the respective state data through each transmitting and receiving circuit part by using IR or RF communication; and in request of the main controller, the data transmission unit for slave transmits the state data for slave and the state data for master received from the data transmission unit for master to the main controller.

7. The data transmission system for automated material handling system according to claim 6, wherein the data transmission unit for slave comprises a serial port and a wireless port; and in request of the main controller, the data transmission unit for master and the data transmission unit for slave transmit the state data itself and the state data received from the opposing transmittance unit to the main controller in real time through the serial port or the wireless port.

8. The data transmission system for automated material handling system according to claim 6, wherein the main controller is a management computer including a notebook computer and the management computer is communicated with the data transmission unit for slave through the serial communication.

9. The data transmission system for automated material handling system according to claim 7, wherein the main controller is a management computer including a notebook computer and the management computer is communicated with the data transmission unit for slave through the serial communication.

10. The data transmission system for automated material handling system according to claim 6, wherein the main controller is a wireless data transmitting and receiving terminal including a wireless data transmitter-receiver and the wireless data transmitting and receiving terminal is wireless communicated with the data transmission units for slave.

11. The data transmission system for automated material handling system according to claim 7, wherein the main controller is a wireless data transmitting and receiving terminal including a wireless data transmitter-receiver and the wireless data transmitting and receiving terminal is wireless communicated with the data transmission units for slave.

12. The data transmission system for automated material handling system according to claim 1, wherein the data transmission unit for master and the data transmission unit for slave stores the input data itself transmitted and received to each other and the opposing input data received from the opposing data transmission unit in an internal random access memory (RAM) of the processor itself.

13. The data transmission system for automated material handling system according to claim 2, wherein the data transmission unit for master and the data transmission unit for slave stores the input data itself transmitted and received to each other and the opposing input data received from the opposing data transmission unit in a non-volatile memory.

\* \* \* \* \*